UNITED STATES PATENT OFFICE.

FREDERICK GREENING, OF UXBRIDGE, ENGLAND, ASSIGNOR OF TWO-THIRDS TO OGLE ROBERT PECK, OF TORONTO, CANADA, AND THOMAS WILLIAM TAYLOR POTTS, OF LONDON, ENGLAND.

SUBSTITUTE FOR IVORY, &c.

SPECIFICATION forming part of Letters Patent No. 408,344, dated August 6, 1889.

Application filed November 30, 1888. Serial No. 292,242. (No specimens.)

*To all whom it may concern:*

Be it known that I, FREDERICK GREENING, a subject of the Queen of Great Britain, residing at Uxbridge, England, have invented a new and useful Substitute for Ivory, Horn, Whalebone, India-Rubber, Gutta-Percha, and other Materials, also as a Coating or Varnish for Waterproofing and other Purposes, of which the following is a specification.

This invention relates to improvements in the manufacture or production of a material or compound adapted to be used as a substitute for ivory, horn, whalebone, india-rubber, gutta-percha, and analogous materials, also as a coating or varnish for capsuling or hermetically sealing bottles, jars, and other vessels, for waterproofing fabrics, and a variety of other purposes.

In carrying out the invention I first prepare a base by treating suitable fibrous or cellulose material, and then dissolve this base in a solvent, both the base and the solvent being prepared in the manner hereinafter more particularly described.

In preparing the base I take any suitable fiber or cellulose matter—such as cotton combings, paper, esparto, grass, or rags—and treat it with a mixture of fuming nitric acid of about 1420° specific gravity and sulphuric acid of about 1840° specific gravity, in the proportions of about thirty per cent., by measurement, of fuming nitric acid to about seventy per cent., by measurement, of sulphuric acid, the temperature of the mixture not to exceed 90° Fahrenheit. The fiber or cellulose matter is thoroughly saturated in this mixture and then allowed to drain, or is pressed, so that the excess of mixture can be recovered. The fiber or cellulose matter, having been treated in the above-named well-known manner, is then allowed to remain in a warm atmosphere for about one hour, when the conversion will be found to have taken place. The mass thus prepared must now be well washed in water to free it as much as possible from the remaining acid, after which it is submitted to a bath composed of sodium chloride and ammonia-alum, in the proportion of about seventy-five per cent. of ammonia-alum to twenty-five per cent. of sodium chloride. I have found that about one pound of this mixture to about three gallons of water is a suitable quantity for treating one pound of the prepared base, and after the base again has been well washed in water, so that every trace of the treatment has disappeared, it is dried, and will then be ready for dissolving in the solvent or solvents.

I prepare the solvent or solvents by distilling acetate of lead and anhydrous lime, in the proportions of about two parts, by weight, of acetate of lead to about one part, by weight, of anhydrous lime. The distillate thus obtained I mix with fusel-oil, in the proportion of about two and a half gallons of the distillate to about one and a half gallon of the fusel-oil, and when thoroughly mixed I add to the mixture any suitable purifying agent—such as phosphoric chloride or carbonate of potash—in the proportion of about twenty-five per cent. of the purifier to one gallon of the mixture and again distill. The distillate is a solvent; but in practice I prefer to add absolute alcohol, in the proportion of, say, one-half gallon of absolute alcohol to each gallon of the mixture. These proportions may be varied; but I have found that the above-named quantities give good results.

The base prepared as above described, being dissolved in the described solvent, will produce a plastic mass which when dry can be used as a substitute for ivory, bone, horn, whalebone, india-rubber, gutta-percha, and other materials.

It will be obvious that the proportions of the base and solvent will vary with the nature of the material required. For example, to produce a good substitute for ivory, bone, horn, whalebone, or hard india-rubber I have found that about equal proportions, by weight, of the base and solvent give good results. While in a plastic state the material can be molded into any required form under suitable heat and pressure, or be formed into sheets by being passed between heated rollers or otherwise, as is usual in treating this kind of material or compound, the required color being obtained by adding to the mass while in a plastic state aniline dyes or ordinary pigments in the usual well-known manner.

When the improved material is required to be used in a liquid state, the proportion of the solvent is increased, so as to form a thin solution, which can be applied to any article as a coating or varnish by means of a brush or in any other suitable manner; or, in the case of bottles, jars, or other vessels which require to be capsuled, the said articles are dipped into the material, which is made of the required consistency.

If the material is required to be of a more or less flexible nature, oils, gums, or hydrocarbons are incorporated therewith.

I claim—

1. The described method of producing substitutes for ivory, horn, and other articles, as set forth, consisting in first preparing fibrous or cellulose substances to constitute a base by treating said substances with a mixture of fuming nitric acid and sulphuric acid in substantially the proportions described, then washing this product and submitting it to a bath of sodium chloride and ammonia-alum, and then dissolving such base in a solvent composed of a distillation of acetate of lead and anhydrous lime mixed with fusel-oil, in substantially the proportions above named, and purified, as set forth.

2. In the manufacture of substitutes for ivory, horn, or other articles, as set forth, the described method of treating a base made from fibrous or cellulose material, consisting in dissolving the same in a solvent composed of a distillation of acetate of lead and anhydrous lime mixed with fusel-oil, in substantially the proportions above named, and purified, as set forth.

FREDERICK GREENING.

Witnesses:
G. F. REDFERN,
JOHN E. BONSFIELD.